Dec. 8, 1925.
F. W. KING
PRUNE HARVESTER
Filed Sept. 5, 1924
1,565,162
2 Sheets-Sheet 2
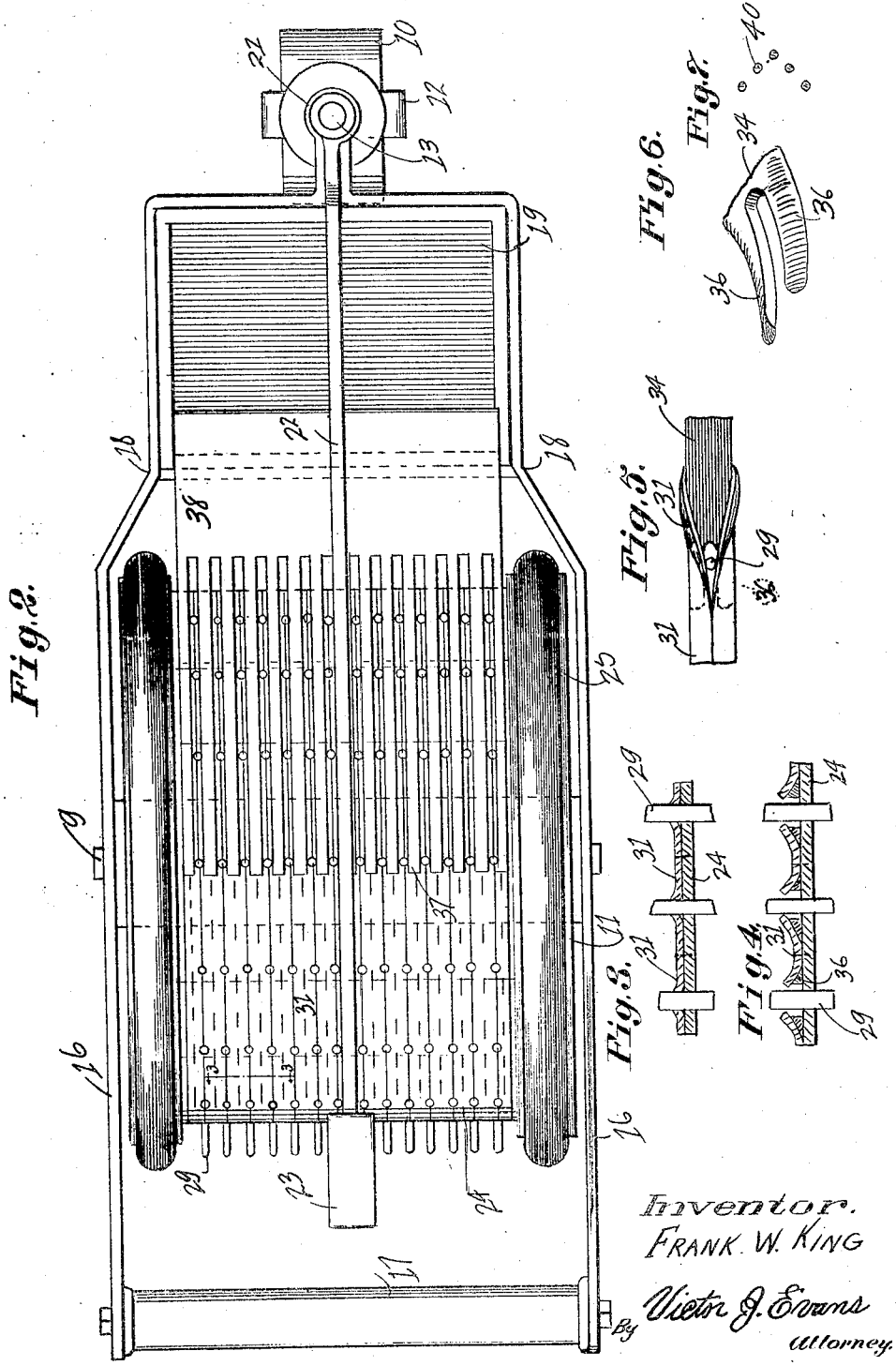

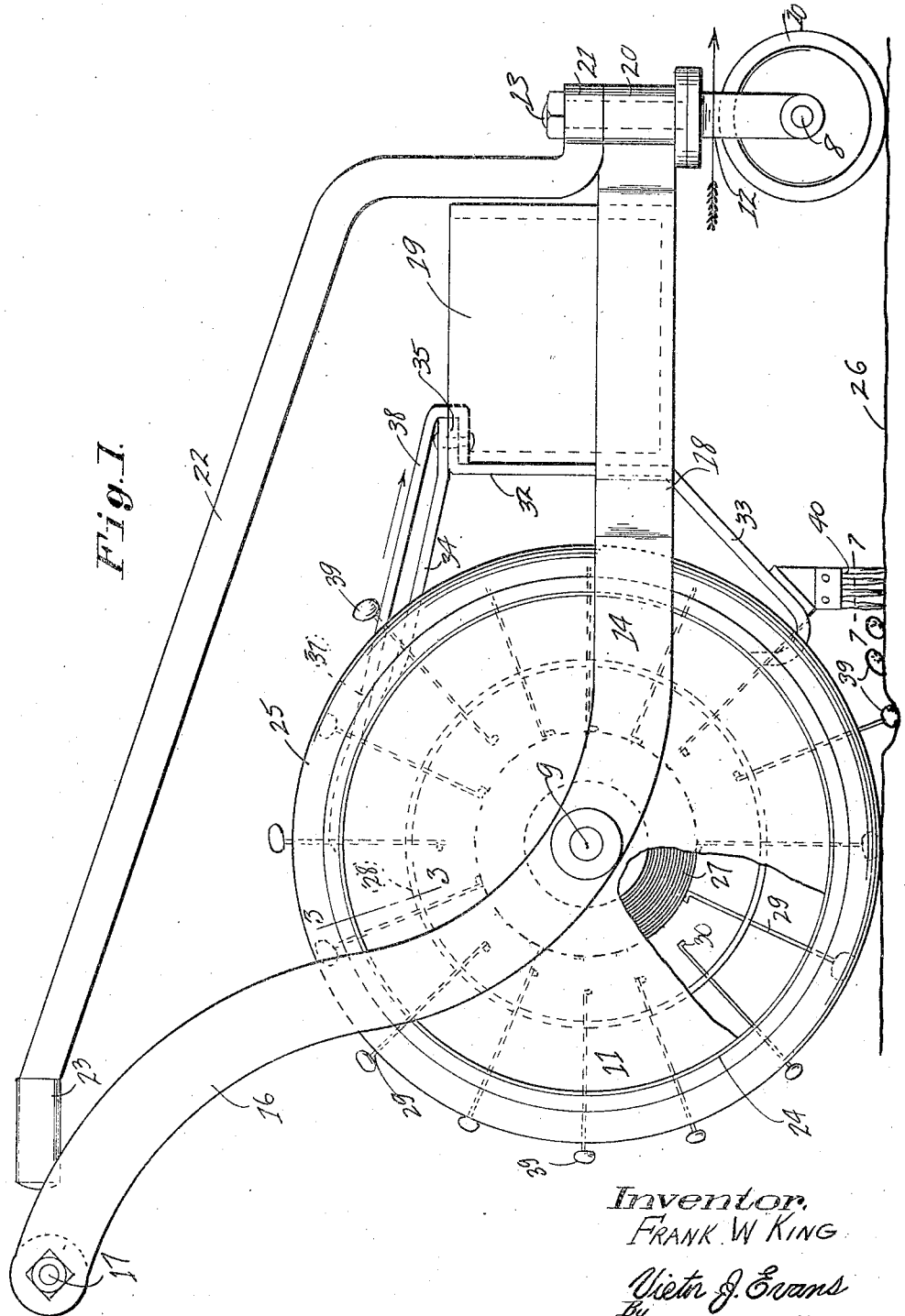

Patented Dec. 8, 1925.

1,565,162

UNITED STATES PATENT OFFICE.

FRANK W. KING, OF KELLOGG, CALIFORNIA, ASSIGNOR OF ONE-HALF TO HEBER L. NAY, OF SEBASTAPOOL, CALIFORNIA.

PRUNE HARVESTER.

Application filed September 5, 1924. Serial No. 736,131.

*To all whom it may concern:*

Be it known that I, FRANK W. KING, a citizen of the United States, residing at Kellogg, in the county of Sonoma and State of California, have invented new and useful Improvements in Prune Harvesters, of which the following is a specification.

This invention relates to improvements in harvesters, and has particular reference to a prune harvester, the object of the invention being to produce a wheeled harvester of the character described whereby prunes are harvested during the actuation of the machine and automatically conveyed to a suitable receptacle carried by the harvester.

A further object of the invention is to produce novel means whereby prunes may be readily harvested irrespective of their position on the ground, or of the unevenness of the ground over which the harvester travels.

An additional object is to provide novel release means whereby the prunes may be released from the picking elements and conveyed to the receptacle of the harvester.

A still further object of this invention is to provide a harvester of the character described which possesses advantageous points relative to efficiency, durability, simplicity of construction and operation, and which is inexpensive to manufacture.

Other objects and advantages will be apparent during the course of the following description.

In the accompanying drawings forming a part of this specification, and in which like numerals are employed to designate like parts throughout the same, Figure 1 is a side elevation of the machine constructed in accordance with my invention, Figure 2 is a plan view of the same, Figure 3 is a sectional detail showing the picking elements frictionally retained by bands which encircle the outer periphery of the drum, the view being taken on the line 3—3 of Fig. 2, Figure 4 is a similar view showing the picking elements out of contact with the bands, Figure 5 is a plan view disclosing the operation of one of the bifurcated release members, which serve to throw the bands out of contact with the picking elements, Figure 6 is a fragmentary detail view of one of the upper bifurcated release members, and Figure 7 is a section through the guard fingers, the view being taken on the line 7—7 of Figure 1.

In the accompanying drawings wherein for the purpose of illustration is shown a preferred embodiment of my invention, the numerals 8 and 9 indicate the front and rear axles of the machine, the front axle being provided with a relatively small steering wheel 10, and the rear axle with a pair of larger sized disc driving wheels 11. The axle 8 has connected thereto a yoke 12 which has vertically positioned thereon a bolt 13. This bolt and the axle 9 are suitably connected by means of a frame which comprises spaced bars 14, which extend upwardly as at 16 so as to retain between their extremities a transverse handle bar 17.

The bars 14 of the frame converge adjacent their extremities as shown at 18 so as to form a support for a prune receiving receptacle 19, while the ends of the bars are connected to form a collar 20 adapted to encircle the bolt 13. Likewise adapted to encircle and actuate the bolt 13 is an extremity 21 of a steering rod 22 which is suitably bent so as to present a handle 23 in a position to be convenient to the operator of the machine. The numeral 24 designates a drum which is mounted on the axle 9 being rotatable therewith and suitably positioned between the disc wheels 11.

It will be observed, as disclosed to advantage in Figure 2, that the wheels are provided with tires 25 so that the periphery of the drum in rotating will always be spaced from the ground 26.

The numeral 27 designates the hub of the axle 9, while the numeral 28 designates a ring spaced from the hub 27 and the drum 24, which ring is suitably connected to the disc wheels 11. This ring is suitably apertured so as to permit movement therethrough of a plurality of picking elements in the form of needles 29. These needles are equipped with knobs 30, which normally contact with the outer periphery of the hub 27 the knobs serving to prevent passage of the needles through the apertures of the ring when the needles are moved outwardly to an operative extended position.

I propose to secure to the outer periphery of the drum a plurality of flexible strips 31, preferably made of rubber as illustrated in Figures 2 and 3, for the purpose of frictionally engaging the needles.

As disclosed to advantage in Figure 1 the numeral 32 designates a metal back plate positioned between the spaced rods 14 at a point in the rear of the receptacle 19, which plate has integrally formed therewith a plurality of lower releasing elements 33, which elements are adapted to be positioned between the rubber strips 31 and are bifurcated so as to allow the needles 29 to pass therethrough. Upper bifurcated release members 34 are secured to an extension 35 of the back plate 32 and are formed as shown to advantage in Figure 7 with inclined sides 36 adapted to be likewise positioned beneath a pair of the flexible strips and so disposed that the needles 29 readily pass therethrough.

By equipping the release members with inclined sides, it will be obvious that the strips will readily fold throughout a part of their length when they contact the release members. The strips thus folded will permit the needles to pass through the bifurcated members, for the needles will be out of frictional contact with the adjacent sides of the strips and will accordingly either fall inwardly so that their knobs contact the outer periphery of the hub, or be extended to an operative position so that they can readily function to penetrate the fruit deposited on the ground.

Mounted above the upper release element 34 are a plurality of longitudinal slats 37 integrally formed with a plate 38 which plate is likewise connected to the extension 35 of the back plate 32.

It will be further observed that the needles pass between the longitudinal slats and convey the prunes 39 to the receptacle 19.

I propose to mount adjacent the ends of the extreme side release members 33, guard fingers 40, which serve to sweep the prunes out of the path of the wheels 11 during the course of travel of the harvester, and thus eliminate the possibility of the fruit being crushed.

In practise the harvester is manually actuated so as to pass over the ground surface 26 where a plurality of prunes have fallen. The needles being released from their frictional engagement with the rubber strips, will fall and be positioned so as to readily pierce the prunes on the ground, irrespective of inequalities in the ground. The prunes will then be carried on the needles due to the rotation of the drum and be positioned so as to pass between the longitudinal slats 37. When the strips are contacted by the upper release members 34, the needles will fall to their normally inoperative position and the prunes being extracted from the needles will pass in the direction of the arrow shown in Figure 1 and be deposited in the receptacle 19.

The needles after passing through the first operation, riding through the slats and conveying the prunes to the receptacle will again be in a position to continuously repeat the operation.

From the foregoing description taken in connection with the accompanying drawing, it will be apparent that I have devised a simply constructed machine whereby a greater quantity of prunes can be readily harvested in a minimum amount of time and labor.

Having thus described my invention, I claim:—

In a device of the character described the combination with a receptacle holding frame including a front steering wheel and a pair of driving wheels, a drum positioned between and rotatable with said driving wheels, a plurality of prune picking elements slidably carried in said drum, co-operating means carried by said drum and frame for periodically releasing said elements for penetrating and retaining thereon the fruit deposited on the ground, said means including flexible bands in frictional contact with the fruit picking elements and secured to the outer periphery of the drum, and release members carried by the frame and adapted to cause a folding of the flexible bands, and conveying means carried by said frame whereby the pierced fruit is conveyed to the receptacle of the frame.

In testimony whereof I affix my signature.

FRANK W. KING.